United States Patent

Anderson et al.

Patent Number: 5,834,141
Date of Patent: Nov. 10, 1998

[54] POSITIVE GRID ALLOYS

[75] Inventors: Carl J. Anderson, Lake Orion; Fred F. Feres, Rochester Hills, both of Mich.

[73] Assignee: Exide Corporation, Reading, Pa.

[21] Appl. No.: 839,302

[22] Filed: Apr. 18, 1997

[51] Int. Cl.[6] .............................. H01M 4/68; H01M 4/73
[52] U.S. Cl. ........................................ 429/245; 429/226
[58] Field of Search ................................ 429/245, 225, 429/226

[56] References Cited

U.S. PATENT DOCUMENTS

| | | | |
|---|---|---|---|
| 2,860,969 | 11/1958 | Walsh . | |
| 3,287,165 | 11/1966 | Jensen . | |
| 3,989,539 | 11/1976 | Grabb . | |
| 4,125,690 | 11/1978 | Bagshaw et al. | 429/245 |
| 4,547,939 | 10/1985 | McDowall et al. . | |
| 4,725,404 | 2/1988 | Reif et al. | 429/245 |
| 4,939,051 | 7/1990 | Yasuda et al. | 429/245 |
| 5,093,971 | 3/1992 | Hien . | |
| 5,298,350 | 3/1994 | Rao | 429/245 |

FOREIGN PATENT DOCUMENTS

| | | |
|---|---|---|
| 1063582 | 8/1992 | China . |
| 56036866 | 4/1981 | Japan . |

OTHER PUBLICATIONS

Bagshaw, "Lead alloys: past, present and future", J. Power Sources, vol. 53, pp. 25–30, 1995.

Bagshaw "Lead Alloys: Past, Present, and Future ", J. Power Sources, (1995), 53 (1) 25–30. (Month unknown), 1995.

Zhong, et al., "Evaluation of Lead–Calcium–Tin–Aluminum Grid Alloys . . . ", J. Power Sources, (1996), 59 (1–2), 123–129. (Month unknown), 1996.

*Primary Examiner*—Kathryn L. Gorgos
*Assistant Examiner*—Carol Chaney
*Attorney, Agent, or Firm*—Nixon & Vanderhye P.C.

[57] ABSTRACT

A battery grid plate composition comprising by percent weight:

| | |
|---|---|
| Calcium | .035–.085 |
| Tin | 1.2–1.55 |
| Silver | .002–.035 |
| Lead | Balance |

9 Claims, 1 Drawing Sheet

POSITIVE GRID ALLOYS

BACKGROUND

Lead is used in lead-acid batteries to manufacture the oxide that is used in making the positive and negative active material. Lead is also used as the supporting and conducting structures, i.e., the positive and negative grid plates, for the active material. In its pure form, however, lead is too soft for the manufacturing processes entailed in making the plates, and for the subsequent assembly into the final battery product.

In order to help strengthen the grid plates, various lead alloys have been proposed and used. For example, conventional automotive lead-acid batteries employ grids made from an antimony-lead alloy in which the antimony content ranges from about 3 to 4½% by weight of the alloy composition. These alloys are capable of being formed at acceptable commercial rates into battery grids by gravity casting techniques. When a lead-antimony alloy is used, however, it causes gassing and subsequent water loss. Moreover, as the percentage of antimony increases, the gassing rate increases.

A hybrid battery consists of a low antimony lead positive grid alloy (generally about 1.3%–1.6% antimony), and a calcium lead negative grid alloy. Since the amount of antimony in the negative grid affects gassing, the change to a calcium lead negative grid alloy lowers the gassing rate. It is, however, important to note that during the life of the battery, antimony will transfer from the positive plate to the negative plate, so that some gassing will occur, even though it is much lower than it would be if the negative grid were made of antimony.

To help lower the gassing rate even further, the positive grid alloy was changed to a lead-calcium alloy composition. These alloys often include additional elements such as tin and silver. In addition, various other additives are used to help in grain refining, such as arsenic, sulfur and copper. While batteries with this grid plate configuration still experience gassing, it is at a rate of only approximately 30% to 40% of a lead-antimony alloy battery.

Various lead-calcium alloys for battery grid plates are disclosed in U.S. Pat. Nos. 4,125,690; 2,860,969; 3,287,165; and 5,298,350. Problems remain, however, as further described below.

Over the past 10 years, automobile styling has changed greatly. The trend is to rounder, more aerodynamically efficient chassis. As a result, the front grilles have decreased significantly in size, and will probably disappear altogether. This grille area was the only area where fresh cooling air could get into the engine compartment, helping to maintain a lower battery temperature.

In addition to (or in some cases as a result of) styling changes, the engine compartment area in the typical automobile has also shrunk, thus forcing all of the components closer to the engine. In some vehicles, close-coupled catalytic converters EGR valves or other components that create High Heat gas, are located adjacent the exhaust manifold, and the intense heat of such converters results in the engine compartment becoming even hotter.

This compactness of design, along with the driving cycles of the populations in the desert southwest and a band along the southern tier of states to Florida, has increased the average temperatures that the battery will experience up to 160° F. or above. In fact, battery electrolyte temperatures in excess of 200° F. have been measured.

The Battery Council International (BCI) periodically conducts an analysis of a large number of batteries under warranty. One such analysis has shown that the areas of the country with the average highest mean temperatures also have the lowest battery life. Among other things, it has been shown that short battery life, due to gassing and attendant water loss (which increases positive grid corrosion and growth) is one of the primary failure modes. The change to an all lead-calcium battery has extended the life of the battery in these areas of the country by reducing gassing and hence water loss, but further improvements are constantly sought.

SUMMARY OF THE INVENTION

There are currently two ways to make lead-calcium alloy positive grids. The first is by the use of book mold casting. The other is with an expanded metal process, using both wrought and cast strip. These techniques are entirely different and require two slightly different lead-calcium alloys.

With the book mold system, the grid produced is relatively rigid with full borders along each side, top and bottom. This lends rigidity to the grid and helps prevent vertical grid growth. Since the structure is basically rigid, a lower calcium content (which tends to help hardness) can be used in order to give it strength during the high temperatures the battery will experience. Silver is added to provide strength. The most important part to the alloy, however, is the tin content. At the quantities used in accordance with this invention, the tin provides another measure of strength at temperatures by providing resistance to intergranular corrosion and grid growth over time. The tin also serves to help in recharging batteries from extremely low depths of discharging, particularly those that are due to at low current (typically milliamps) draw.

Expanded metal provides a grid with a top border but with no side frames and no substantial bottom border. Because the grid is expanded, the pattern itself inherently has grid growth problems. In order to overcome this, the alloy needs to be modified vis-a-vis the alloy produced by the book mold process. Specifically, a higher calcium content provides the necessary hardness, while the tin remains substantially the same. The silver content is lowered, however, because it's use in higher concentrations would make the grid material too hard. Within the expanded metal processes, both wrought and cast strip may be used, and the alloy in accordance with this invention would remain essentially the same for both types of expanded metal processes.

In the exemplary embodiments, specific lead calcium alloys including specified amounts of tin and silver as described further herein have been found effective to reduce gassing and to thus prolong battery life.

Accordingly, in its broader aspects, the invention relates to a battery grid plate composition comprising by percent weight:

| | |
|---|---|
| Calcium | .035–.085 |
| Tin | 1.2–1.55 |
| Silver | .002–.035 |
| Lead | Balance |

In another aspect, the invention relates to a battery grid plate formed by a book mold process consisting essentially of, by percent weight:

| | |
|---|---|
| Calcium | .035–.055 |
| Tin | 1.3–1.55 |
| Silver | .025–.035 |
| Aluminum | .005 |
| Lead | Balance |

In still another aspect, the invention relates to a battery grid plate formed by an expanded metal process consisting essentially of, by percent weight:

| | |
|---|---|
| Calcium | .045–.085 |
| Tin | 1.20–1.55 |
| Silver | .002–.0049 |
| Lead | Balance |

Other objects and advantages will become apparent from the detailed description which follows.

DETAILED DESCRIPTION OF THE DRAWINGS

Figure 1:
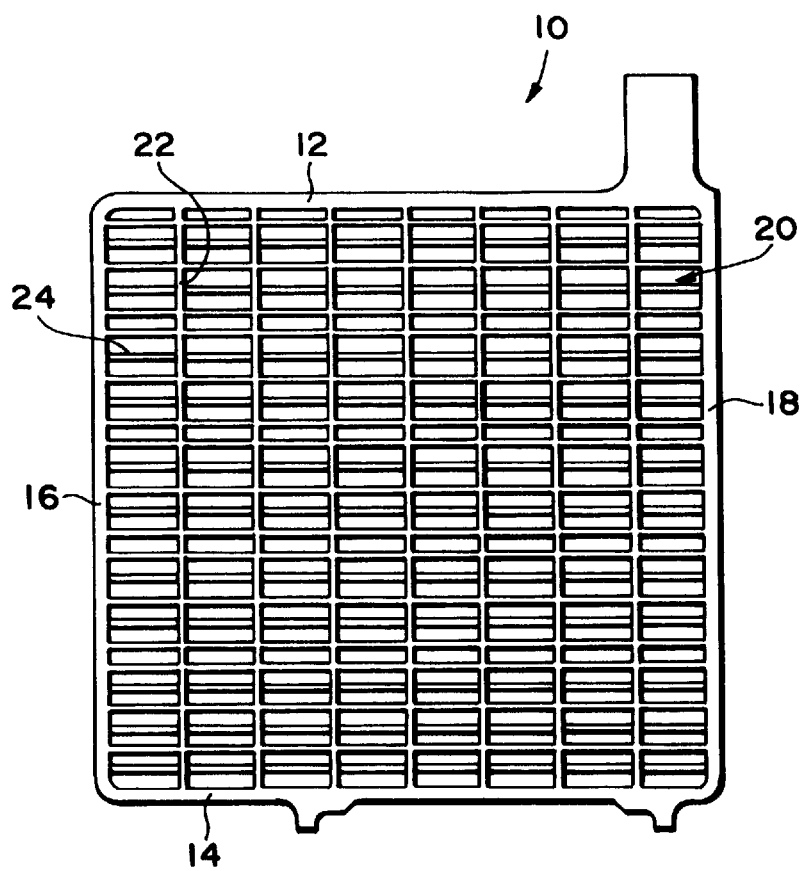
FIG. 1 is a side elevation of a conventional grid plate formed by a book mold process.

Referring to FIG. 1, a positive grid 10 is illustrated, of the type generally produced by a conventional book mold system. The grid 10 is formed with full top, bottom and side border portions 12, 14, 16 and 18, respectively, along with an interior grid 20 formed by mutually perpendicular webs or grid members 22, 24.

Figure 2:
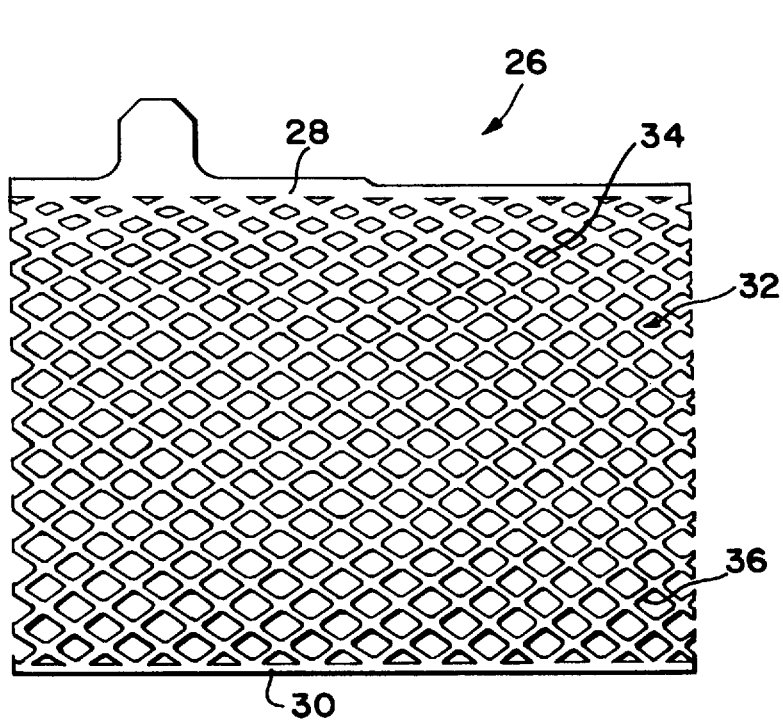
FIG. 2 is a side elevation of a conventional grid plate formed by a metal expansion process.

Turning to FIG. 2, a positive grid 26 is illustrated, and which is of the type formed by a conventional expanded metal process. In this case, the grid 26 is formed with a top border 28 and a bottom border 30, but there are no discrete side borders. Moreover, the lower or bottom border 30 has a lesser thickness or width than the top border 28. The interior grid 32 is formed by a plurality of oppositely oriented, diagonal webs or grid members 34 and 36. By nature, the grid formed by the conventional expanded metal processes (using either cast strip or wrought strip) inherently has grid growth problems, and is less rigid than the grid 10 described hereinabove.

In accordance with this invention, a positive grid plate for a battery has the following composition by percent weight:

| | |
|---|---|
| % Calcium | .035–.085 |
| % Tin | 1.20–1.55 |
| % Silver | .002–.035 |
| % Lead | Balance |

For positive grid plates formed by conventional book mold processes, aluminum in the amount of 0.005% by weight may be included.

Depending upon the specific forming process for the positive grid plate, the following examples are illustrative of the preferred compositions in accordance with this invention.

EXAMPLE 1

In accordance with this invention, the positive grid plate formed by the conventional book mold process, has the following composition by percent weight:

| | |
|---|---|
| % Calcium | .035–.055 |
| % Tin | 1.2–1.55 |
| % Silver | .025–.035 |
| % Aluminum | .005 |
| % Lead | Balance |

EXAMPLE 2

In accordance with another exemplary embodiment of the invention, the positive grid formed by an expanded metal process has the following composition, by percent weight:

| | |
|---|---|
| % Calcium | .045–.085 |
| % Tin | 1.20–1.55 |
| % Silver | .002–.0049 |
| % Aluminum | None |
| Lead | Balance |

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A battery grid formed by a book mold process having a composition consisting essentially of, by percent weight:

| | |
|---|---|
| Calcium | .035–.085 |
| Tin | 1.2–1.55 |
| Silver | .002–.035 |
| Aluminum | .005 |
| Lead | Balance |

2. The battery grid of claim 1 wherein the calcium content is between 0.035 and 0.055 by percent weight.

3. The battery grid of claim 1 wherein the silver content is between 0.025 and 0.035 by percent weight.

4. The battery grid of claim 1 wherein the calcium content is between 0.045 and 0.085 by percent weight.

5. The battery grid of claim 1 wherein the silver content is between 0.002 and 0.0049 by percent weight.

6. A battery grid formed by a book mold process consisting essentially of, by percent weight:

| | |
|---|---|
| Calcium | .035–.055 |
| Tin | 1.2–1.55 |
| Silver | .025–.035 |
| Aluminum | .005 |
| Lead | Balance |

7. A battery grid formed by an expanded metal process consisting essentially of, by percent weight:

| | |
|---|---|
| Calcium | .045–.085 |
| Tin | 1.20–1.55 |
| Silver | .002–.0049 |
| Lead | Balance |

8. The battery grid of claim 7 formed with cast strip.

9. The battery grid of claim 7 formed with wrought strip.

* * * * *